UNITED STATES PATENT OFFICE.

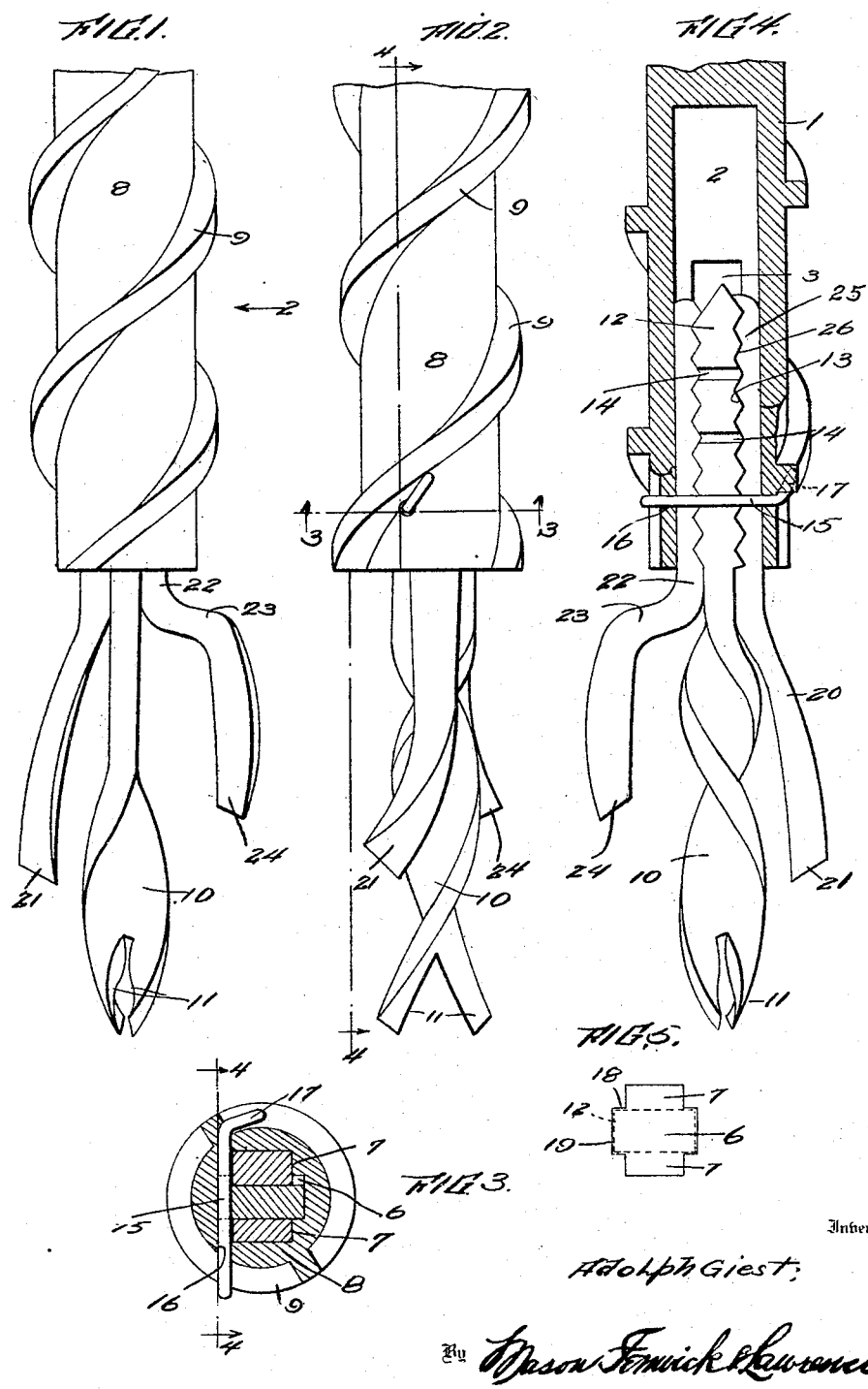

ADOLPH GIEST, OF NANTICOKE, PENNSYLVANIA.

DRILL.

1,220,217. Specification of Letters Patent. Patented Mar. 27, 1917.

Application filed May 16, 1916. Serial No. 97,905.

*To all whom it may concern:*

Be it known that I, ADOLPH GIEST, a citizen of the United States, residing at Nanticoke, in the county of Luzerne and State of Pennsylvania, have invented certain new and useful Improvements in Drills; and I do hereby declare the following to be a full, clear, and exact description of the invention, such as will enable others skilled in the art to which it appertains to make and use the same.

This invention relates to boring, and more especially to screw augers; and the object of the same is to produce a drill adapted especially for use in coal mining and having a central auger and two adjustable, removable and interchangeable side bits—all connected with the drill stem in a peculiar manner as hereinafter more fully described and claimed and as shown in the drawings wherein—

Figure 1 is a side elevation of this improved drill wherein the auger has but a single twist, and Fig. 2 a side elevation viewed in the direction of the arrow 2 in Fig. 1, but with the auger having a double twist.

Fig. 3 is a cross section on the line 3—3 of Fig. 2, Fig. 4 is a vertical section on the lines 4—4 of Fig. 3 and Fig. 2, and Fig. 5 is a diagram to be referred to hereinafter.

The drill stem 1 has a bore 2 which at its lower end is shaped into a socket 3 of a cross section best seen in the diagram of Fig. 5. That is to say, it has an oblong center 6 and two side channels 7 so that the contour of the entire socket is the same as that of the Greek cross. The body 8 of the stem is externally cylindrical excepting for the threads 9 which preferably have flat upper working faces as shown.

The central bit, herein called the "auger," is numbered 10 and has cutting points 11 at its lower end and a twisted body, Fig. 1 showing the body with one twist and Figs. 2 and 4 with two twists although this is not important. Its shank 12 is oblong in cross section as indicated in dotted lines in Fig. 5, and is of a size to fit slidably within the center 6 of the socket 3 in the stem 1. The opposite flat faces of said shank are roughened as by means of teeth or serrations 13, and across one edge of the shank is cut a notch or notches 14 as best seen in Fig. 4. For holding this auger in place a pin 15 is provided, passing through alined holes 16 in the walls of the drill stem 1, and along one of the notches 14 in said shank 12; and the head 17 of this pin, while of any suitable shape, is here shown as deflected slightly and closely underlying one of the threads 9 on the exterior of the drill body 8, so that the material traveling up the working face of said thread will not interfere with the head of the pin. It is obvious that the shank of the auger can be inserted into the oblong center 6 of the socket 3 and adjustably held in position therein by the pin which may be passed through any of the notches 14. Said socket is of one configuration throughout its length, and therefore the tips of the serrations or teeth bear against the shoulders 18 alongside both channels 7, while the edges of the shank 12 bear against the ends 19 of the oblong center 6 of said socket, and the pin holds the auger from longitudinal movement.

I provide each drill with a plurality of side elements which usually are cutters herein called "bits," and whose configuration may be substantially that shown or whatever is desired. In the drawings I have shown one bit 20 whose cutting end is deflected slightly outward to its point 21, and another bit 22 whose body has an offset 23 bringing its cutting end considerably to one side of the auger and throwing its point 24 quite remote therefrom; but I do not wish to be limited in this respect. One or both of these bits may be used in connection with the auger, and their purpose is obviously to ream out the hole being bored into the coal or other material, while the cutting points 11 of the auger travel in advance of these side bits and the twist of the auger-body as well as the threads 9 on the stem-body constantly discharge the material drilled. The shank 25 of each bit is of one size throughout its length, flat on both edges and its outer face, and roughened as by teeth or serrations 26 on its inner face adapted to engage those numbered 13 on the auger shank 12; and the general contour of the shank 25 is such that it will fit one of the channels 7 which are left open when the auger shank fills the center 6 as shown in the diagram of Fig. 5. Therefore, as these shanks 25 are not as wide as the auger shank 12, the pin 15 may pass through one of the notches 14 and across the front edges of both bit shanks. In other words, while the auger is held in the stem by the engagement of its shank with the central portion of the socket 3 and fastened by the pin 15, the bits are held in the stem by the engagement of their shanks with the channels 7 of the socket and fastened by the interengagement of their serrations 26 with those numbered 13 on the auger.

It follows from this construction that either or both the bits can be adjusted longitudinally with respect to the auger and therefore with respect to the stem, as all shanks stand parallel with the axis of the same, or the auger can be adjusted with respect to the stem if there be a plurality of notches 14. Or one or both the drills might be removed and the auger would still be operatively and adjustably connected with the stem. In this case, however, I prefer to insert other elements such as blanks or plugs to take the place of the shanks of the bits, mainly to prevent the accumulation of material within the channels 7 of the socket 3 alongside the shank of the auger; and these blanks may be made like the shanks of the bits with serrations so that they will be locked in place the same as the bits would be, but they will have nothing projecting below the lower end of the stem. Among the set of bits provided with each drill are those having a wide variety of shapes, so that the miner can select such bits as fit the occasion. It may be wise to provide several of the popular shape, so that one set of bits can be ground while the other is being used; and for a similar reason it may be wise to provide several of the main augers 10—these also possibly with variously shaped cutting points 11.

I am aware that drills have heretofore been patented having a central auger and adjustable side bits, but ordinarily the bit and auger were necessary to each other in order to hold all parts properly in place. I am not aware of such an arrangement wherein any of the three members may be adjusted. Also I know of one drill wherein there is an auger removably mounted in the stem by means much like that described above, and a single side bit adjustably mounted in the stem along with the auger and on a line oblique thereto—the same serrations or teeth being employed. But in this case it is obvious that adjustment of the bit would set its cutting point either farther from or nearer to the axis of the auger, and therefore change the size of the hole being bored. In my invention both bits are adjusted on lines absolutely parallel with the axis of the auger, and therefore adjustment does not affect the size of the hole being bored. The reason well known to miners why these side bits are adjustable, is because it is usually desired that the cutting point of one shall stand a little in advance of that of the other, and as they do not wear off always at equal speed adjustment is frequently necessary. I am not aware of the existence of a drill in which the socket has the sectional configuration of a Greek cross, with the advantages brought out above.

What I claim is:

1. In a drill, the combination with a stem having a socket of the configuration of a Greek cross; of an auger having a shank oblong in section and of a size to extend across the center and into two opposite arms of said cross-shaped socket, one edge of said shank being transversely notched, a fastening device removably passing through the stem and across its socket at a point to lie in such notch, elements fitting the two remaining arms of the socket, and means for holding them in place from the shank when it is in position, for the purpose set forth.

2. In a drill, the combination with a stem having in its lower end a socket of the configuration of a Greek cross and embodying an oblong center and side channels opening thereinto; of an auger having a shank of a size to fit said center and serrated on its opposite faces, side bits having shanks of proper size to fit said channels and serrated on their inner faces to engage the serrations of the auger-shank, all shanks being parallel, and a removable fastening device connecting said stem with the auger-shank.

3. In a drill, the combination with a stem having in its lower end a socket of the configuration of a Greek cross and embodying an oblong center and side channels opening thereinto; of an auger having a shank of a size to fit said center and serrated on its opposite faces and notched in one edge, side bits having shanks of proper size to fit said channels and serrated on their inner faces to engage the serrations of the auger-shank, and a removable fastening pin passing through said stem, across the corresponding edges of said bit-shanks, and through one of said notches in the auger-shank.

In testimony whereof I affix my signature.

ADOLPH GIEST.